Feb. 8, 1944.   F. W. LURMANN ET AL   2,341,052
VEGETABLE CUTTER
Filed Aug. 31, 1942   2 Sheets-Sheet 2

INVENTORS
FREDERICK W. LURMANN
AND AMOS C. SWAYNE,
BY
ATTORNEYS

Patented Feb. 8, 1944

2,341,052

UNITED STATES PATENT OFFICE 2,341,052

VEGETABLE CUTTER

Frederick W. Lurmann, Sunnyvale, and Amos C. Swayne, Los Altos, Calif., assignors to Schuckl & Co., Inc., San Francisco, Calif., a corporation of California Application August 31, 1942, Serial No. 456,732

2 Claims. (Cl. 146—78)

This invention relates to vegetable cutters and graders and more particularly to cutters for stalk vegetables, such as asparagus, celery and the like.

It is an object of this invention to provide a simplified, fully automatic apparatus to cut vegetable stalks into the desired lengths and to effect preliminary grading of the resulting pieces.

It is another object of the invention to provide a fully automatic machine which will separate the trims from the select pieces of the vegetables and to thus eliminate the necessity for hand grading or separation of same.

Other objects of the invention will become more apparent as this specification proceeds and the novelty of the device will be particularly pointed out in the appended claims.

In the drawings forming a part hereof;

It is customary in the vegetable canning art to trim or cut stalk vegetables, such as asparagus, into pieces of uniform length to enhance the appearance of the resulting pack, and at the same time to facilitate the packing of same, as the containers are of standard depth. It is with this practice that the present invention is concerned.

In terms of general inclusion, the objects of this invention are attained by providing a plurality of asparagus receiving cups, arranged in endless series, traversing a plurality of loading stations at which the asparagus spears are placed in the cups, spear end down. The cups are divided or split along the horizontal to permit passage of the loaded cups through the stationary cutting means. In the initial cutting operation, a rotary knife trims off the butt ends of the stalks projecting above the tops of the cups and with coacting means conveys them to a separate station for other packing use or discard, as the case may be. When thus initially trimmed, the asparagus stalks in the divided cups progress through a plurality of stationary knives disposed in the path of the cups which knives enter the horizontally arranged slots to cut the remainder of the stalk into the required number of lengths for subsequent grading and packing. Beyond the cutting operations, the machine makes provision for discharge of stalks of the larger and smaller diameters at different stations to facilitate the subsequent or final grading of the vegetable pieces.

Figure 2:
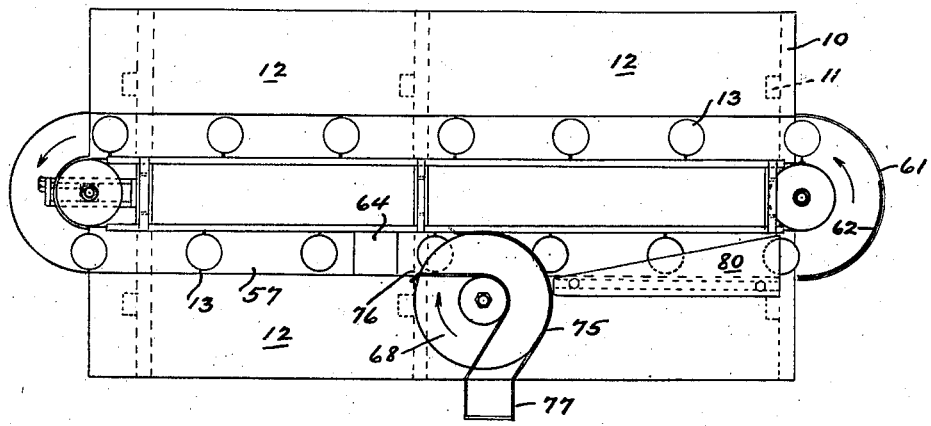
Figure 2 is a top plan view of the machine of Figure 1.

In the drawings we show a preferred embodiment of our invention, but it will be appreciated that the principles of the invention may take forms other than that shown. The preferred form of the invention is mounted on a table 10 having legs 11 and, as the endless conveyor mechanism and the cutting apparatus is disposed medially of the table 10, a plurality of work stations 12 are provided on opposite sides, as shown in Figure 2. It will be appreciated, of course, that while for purposes of illustration we have shown but a few such work stations, the number may be increased as desired by merely lengthening the table 10 and the associated endless conveyor mechanism.

A plurality of asparagus cups 13 are supported at spaced intervals between upper and lower endless chain members, 15 and 16, respectively, acting as a conveyor, said cups being connected thereto by means of brackets 14. The endless members, as shown in Figure 2, are arranged in a loop extending longitudinally of table 10. The chains 15 and 16 are driven by upper and lower sprockets 20 and 21, respectively, fixed on a common shaft 22, journalled in the table frame as at 23 and 24. Rotative movement is imparted to shaft 22, and hence to the driving sprockets 20 and 21, through the provision of bevel gears 28 and 29, the latter being keyed on shaft 30, suitably journalled as at 31 in the table frame, and having on its opposite end a sprocket or pulley 35 operatively connected to a prime mover, such as the electric motor 36, supported on shelf 37, disposed between the table legs 11.

At the opposite end of the table 10, we provide idler sprockets 40 and 41, for the chains 15 and 16, respectively, which sprockets are keyed on a common shaft 42 journalled in a conventional take-up or adjustment means 43.

Figure 1:
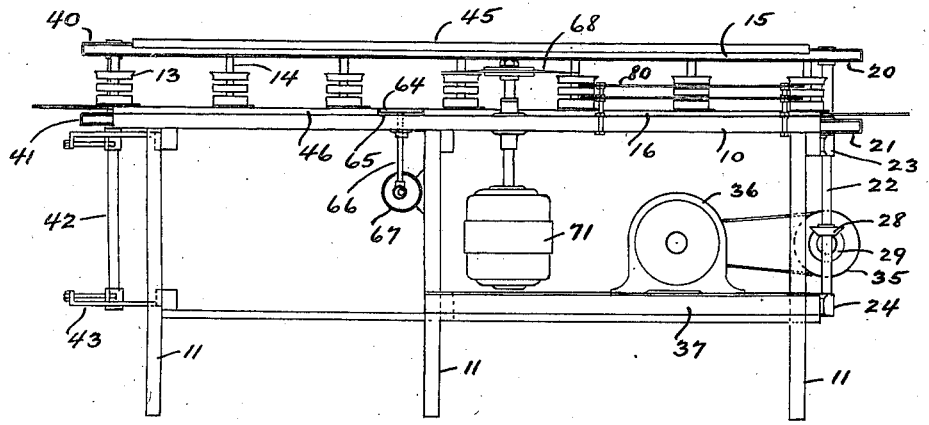
Figure 1 is a side elevation of a machine embodying the principles of the invention.
Figure 4:
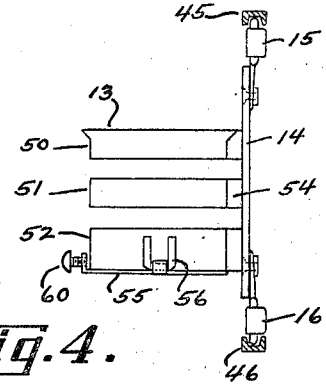
Figure 4 is a side elevation of one of the divided cups with its associated chain links.
Figure 5:
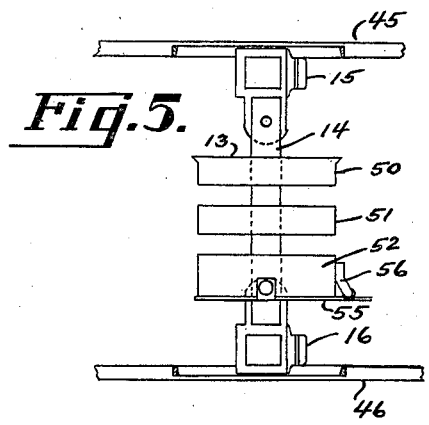
Figure 5 is a front elevation of the subject-matter of Figure 4.

As will be noted from Figures 1, 4 and 5, chains 15 and 16 travel in suitable guide means, such as the U-shaped members 45 and 46, respectively. Guide means 46 may be fixed on the surface of table 10 and guide means 45 supported thereabove by any conventional device, such as posts or the like (not shown).

Figure 6:
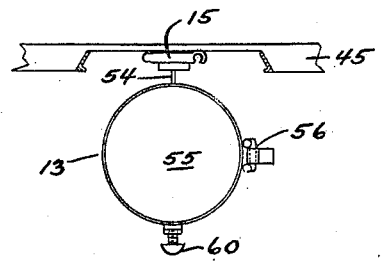
Figure 6 is a top plan view of the subject-matter of Figures 4 and 5.

The characteristics of the asparagus cups are shown to best advantage in Figures 4 to 6, inclusive, as including a plurality of collar-like members 50, 51 and 52, arranged in vertical alignment and each being connected to the bracket 14 by means of an ear 54. As will be noted in Figures 4 and 5, the upper cup section 50 is outwardly flared to facilitate the insertion of the vegetable stalks. The lowermost cup section 52 is provided with a bottom 55 hinged at one side as at 56.

It will be appreciated that as the vegetable cups 13 traverse the length of the table 10, the hinged bottoms 55 are supported in their closed positions by the top of the table 10, or a suitable runner 57 provided thereon (see Figure 2). A simplified means is provided for discharging the contents of selected cups 13 at a different stage of the operation from the remainder of the cups.

Normally, the bottom 55 would swing open by gravity and under the weight of the contents of the cup the moment the latter passes beyond the end of the table 10 or the runner 57 to discharge the cup contents into a conveyor means or receptacle (not shown). To retard the opening of certain of the cups which may carry stalks preliminarily graded at station 12, we provide a lug 60, shown in Figures 4 and 6, in the form of a screw 60 having a threaded connection with an upturned portion of bottom 55. The lug 60 projects laterally from the cup bottom 55 on the side of the cup opposite its connection to the bracket 14 and is adjustable to different lengths. A semicircular track 61 is disposed at the discharge end of the table 10, on a plane parallel to the top of the same, or the runner 57 thereon, and one or more cams 62 are fixed within the trackway 61 to support lugs 60 until the particular cups have reached the point at which it is desirable to open the bottoms 55 to discharge the cup contents into a conveyor means or the like to segregate particular stalks from the remainder.

As it is desirable for sake of uniformity that the vegetable stalks be fully settled in the cups prior to the trimming and cutting operations, we provide a tamping plate 64 in an opening 65 in runner 57 (see Figures 1 and 2). The plate 64 is fixed on the end of stem 66 connected to an eccentric 67 bracketed to one of the table legs 11. Rotative movement may be imparted to eccentric 67 by any conventional drive means (not shown) to vibrate plate 64 and thus tamp the bottoms 55 of passing cups 13 to settle the stalks therein.

Figure 3:
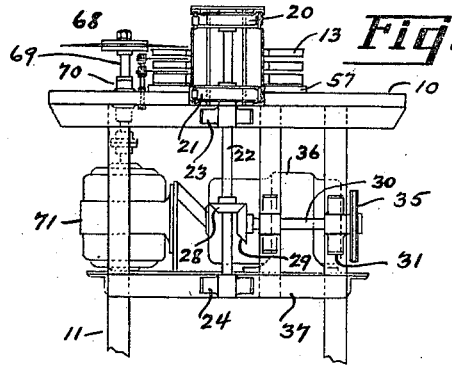
Figure 3 is an end elevation of the machine of Figure 1, looking at its discharge end.

The first cutting operation is to trim off such parts of the stalks as project above the cups 13. In the case of asparagus this would be the butt ends as the spear ends are downmost in the cups. Such butt ends are unfit for canning as such although suitable for flavoring or as ingredients of other foods, such as soups. In the machine forming the subject-matter hereof the trimming operation is accomplished by a rotary disc knife 68 keyed on a vertically disposed shaft 69, journalled in a bearing 70 in table 10 and directly connected to an electric motor 71 supported on the shelf 37. The knife 68 is set to barely clear the tops of cups 13 and to thus produce a shearing action on stalks projecting therefrom. (See Figures 1, 3 and 7).

Since the butt ends trimmed by knife 68 are not to be commingled with the other and more choice parts of the stalks, provision is made for their discharge as an incident of the trimming operation. A hook-shaped guideway 75 is supported above knife 68 in any conventional manner, such as by bracketing to table 10 (not shown), with its intake end 76 overlying the path of cups 13 and its tail end terminating in a discharge chute 77 projecting laterally from table 10. As knife 68 rotates clockwise (looking at Figure 2) centrifugal force will drive the trimmed butts against the side of guideway 75 and the knife will convey them to discharge chute 77.

Figure 7:
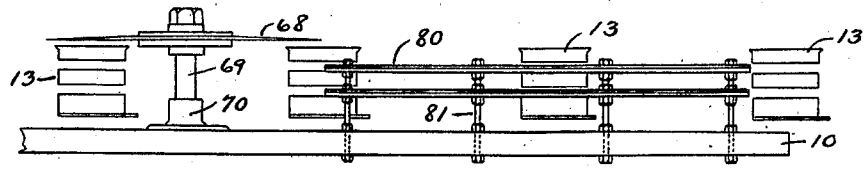
Figure 7 is a detailed view of the rotary and fixed cutter elements of the device, shown in side elevation.
Figure 8:
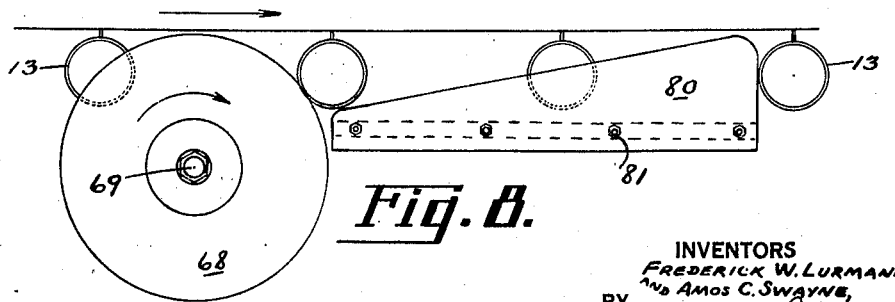
Figure 8 is a top plan view of the subject-matter of Figure 7.

Reduction of the trimmed stalks in cups 13 into pieces of the desired length is effected by means of the stationary knives 80 arranged in stacked spaced relationship on the posts 81 fixed in table 10. As will be noted from Figures 2 and 8, knives 80 are substantially triangular in shape with their cutting edges bisecting the path of the cups 13 to produce a shearing cut on the stalks as the cups progress. As shown in Figures 1 and 7, knives 80 are so spaced on posts 81 that they are in registry with the divisions in cups 13 with the result that the latter may be truly said to pass through the knives.

While we have shown only three divisions in cups 13, it is manifest that the number may be increased or reduced, as a matter of preference according to the number of stalk pieces desired, by interchange of cups 13 and knives 80.

The operation of the machine will be understood from the foregoing to be as follows: operators at stations 12 manually fill cups 13 passing on the conveyor formed by chains 15 and 16; in the case of asparagus, placing the spear ends down on the bottoms 55. Preliminary grading is effected at stations 12 by placing stalks of larger or select diameters in such of the cups 13 as are provided with lugs 60. The loaded cups pass to the trimming knife 68 by which the butts are removed and forced into guideway 75 and subsequent discharge through chute 77.

The loaded, divided cups 13 next pass through stationary knives 80 by which the stalks are reduced into pieces of the desired length. As the cups (other than those equipped with lugs 60) pass over the end of table 10 or runners 57 thereon the weight of the contents will swing the bottoms 55 on the hinges 56 to discharge the contents onto a conventional conveyor or into a receptacle for transport to further processing. Discharge from selected cups is retarded, as an incident of grading, by means of lugs 60 riding the length of cam 62 in camtrack 61, at the terminus of which the weight of the stalks will cause the bottoms 55 to open for discharge of the contents at a point separate from the contents of the other cups.

From the preceding description, it will be appreciated that we have devised an extremely efficient apparatus for the intended purpose. The machine is economical to construct, has few working parts and is safe to operate. Additionally, it permits the produce to be speedily and automatically handled, both of which are important factors in modern canneries.

We desire full protection according to the scope of the appended claims.

The invention claimed is:

1. A vegetable stalk cutter comprising, a table, an endless member arranged in the form of a loop of greater length than and extending longitudinally of the table and medially disposed thereon to define work stations on its opposite sides, a plurality of stalk cups carried at spaced intervals by the endless member, each of said cups being divided into a number of sections along several horizontal planes and having a hinged bottom, means co-extensive with the table for retaining the cup bottoms in closed position during the filling and cutting operations, a rotary knife supported on the table and disposed on a horizontal plane with its cutting edge overlying the path of the cups and clearing the uppermost edge thereof, take-off means associated with said rotary knife to discharge the stalk portions cut thereby, a plurality of stationary cutters supported on the table in stacked spaced relation in the path of the cups in registry with the divisions between said cup sections, said stationary cutters being angularly disposed with respect to the path of travel of the cups to produce a shearing cut on the stalks carried thereby, lugs on the hinged bottoms of selected cups, and a cam member projecting from an end of said table cooperating with said lugs to retain the bottoms of the selected cups in closed position for a greater period of time than the remainder of said cups.

2. A vegetable stalk cutter comprising, a table, vertically disposed shafts at opposite ends of the table, upper and lower sprockets on each of said shafts, upper and lower endless flexible members engaging the respective sprockets on said shafts, upper and lower guide means for said endless members disposed between opposite sprockets, a plurality of stalk cups mutually carried by said endless members at spaced intervals, each of said cups being divided into a number of sections along several horizontal planes, a rotary knife supported by the table and disposed on a horizontal plane with its cutting edge overlying the path of the cups and clearing the uppermost edge thereof, take-off means associated with said rotary knife to discharge the stalk portions cut thereby, and a plurality of stationary cutters supported on the table in stacked spaced relation in the path of the cups in registry with the divisions between said cup sections, said stationary cutters being angularly disposed with respect to the path of travel of the cups to produce a shearing cut on the stalks carried thereby.

FREDERICK W. LURMANN.
AMOS C. SWAYNE.